United States Patent [19]

Mannschreck

[11] Patent Number: 5,396,864
[45] Date of Patent: Mar. 14, 1995

[54] METHOD OF DISPOSING OF ANIMAL WASTES

[76] Inventor: Susan N. Mannschreck, Rte. 4, Box 100, Atoka, Okla. 74525

[21] Appl. No.: 378,857

[22] Filed: Jul. 12, 1989

[51] Int. Cl.⁶ ............................................... A01K 29/00
[52] U.S. Cl. ..................................... 119/174; 119/168
[58] Field of Search ...................... 119/1, 19, 165, 168, 119/174; 383/10, 17, 66, 120

[56] References Cited

U.S. PATENT DOCUMENTS

| | | | |
|---|---|---|---|
| Re. 30,424 | 11/1980 | Heldenbrand | 119/1 |
| D. 245,191 | 7/1977 | Gore | D30/99 |
| D. 273,718 | 5/1984 | Dugan | D30/99 |
| 584,555 | 6/1897 | Lorenz | 383/120 |
| 2,703,426 | 3/1955 | Barkl | 383/66 X |
| 3,144,931 | 8/1964 | Long | 383/120 X |
| 3,154,052 | 10/1964 | Sweeney | 119/1 |
| 3,286,826 | 11/1966 | Stoll | 119/1 X |
| 3,581,975 | 6/1971 | Riccie | 119/1 X |
| 3,743,170 | 7/1973 | Riccio | 119/1 |
| 3,793,989 | 2/1974 | Clark | 119/1 |
| 3,831,557 | 8/1974 | Elesh | 119/1 |
| 3,886,901 | 6/1975 | Zeitter | 119/1 |
| 3,890,930 | 6/1975 | Clark | 119/1 |
| 4,014,292 | 3/1977 | Coughlin et al. | 119/1 |
| 4,164,314 | 8/1979 | Edgar | 119/1 |
| 4,271,787 | 6/1981 | Wellman et al. | 119/1 |
| 4,348,982 | 9/1982 | Selby | 119/1 |
| 4,441,451 | 4/1984 | Neal | 119/1 |
| 4,487,163 | 12/1984 | Jobert et al. | 119/1 |
| 4,501,226 | 2/1985 | Bienvenu et al. | 119/1 |
| 4,541,360 | 9/1985 | Higgins et al. | 119/1 |
| 4,624,380 | 11/1986 | Wernette . | |
| 4,628,863 | 12/1986 | Eichenauer | 119/1 |
| 4,683,839 | 8/1987 | Uhrick | 119/1 |
| 4,691,368 | 9/1987 | Roessiger | 383/10 |
| 4,691,369 | 9/1987 | Costa | 383/17 |
| 4,696,050 | 9/1987 | Sengewald | 383/10 |
| 4,711,198 | 12/1987 | Mossbarger | 119/1 |
| 4,782,788 | 11/1988 | Arrand . | |
| 4,784,083 | 11/1988 | Kiel | 119/1 |
| 4,788,935 | 12/1988 | Balla et al. | 119/1 |
| 4,884,527 | 12/1989 | Skirvin | 119/1 |
| 4,981,104 | 1/1991 | Goodwin . | |

FOREIGN PATENT DOCUMENTS 2608012 6/1988 France ................................ 119/1

*Primary Examiner*—Todd E. Manahan
*Attorney, Agent, or Firm*—Dunlap & Codding

[57] ABSTRACT

A method of disposing of animal excrement uses a container having a bottom wall, a front wall, a rear wall, a first side wall and a second side wall. The front wall, the rear wall and the first and the second side walls each are connected to the bottom wall and cooperate with the bottom wall to encompass a pet receiving space in an opened position of the container in which litter material is placed. The ends of the side walls and the front and rear walls, opposite the ends connected to the bottom wall are connected. The side walls each are gusseted so that the container may be collapsed to a position wherein the side walls and the front and rear walls are folded onto the bottom wall in the collapsed position of the container. The container is opened from the collapsed position to an operating position wherein the side walls and the front and rear wall each extend a distance upwardly from the bottom wall and cooperate to enclose the pet receiving space. A pet opening is formed through the front wall of the container and the pet opening is sized so that a pet can enter into the pet receiving space via the pet opening. After use by the pet, the container is collapsed and disposed of.

1 Claim, 2 Drawing Sheets

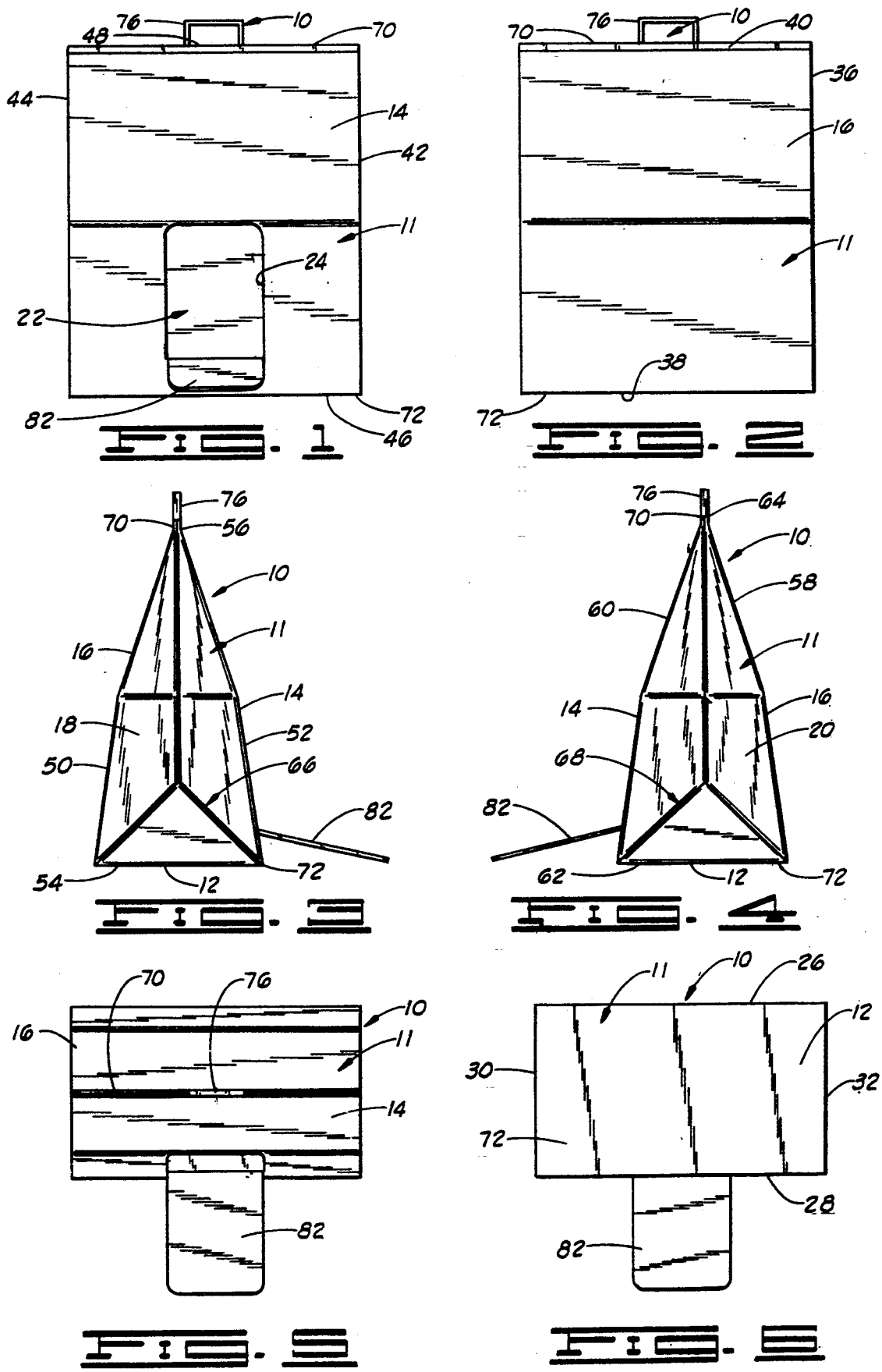

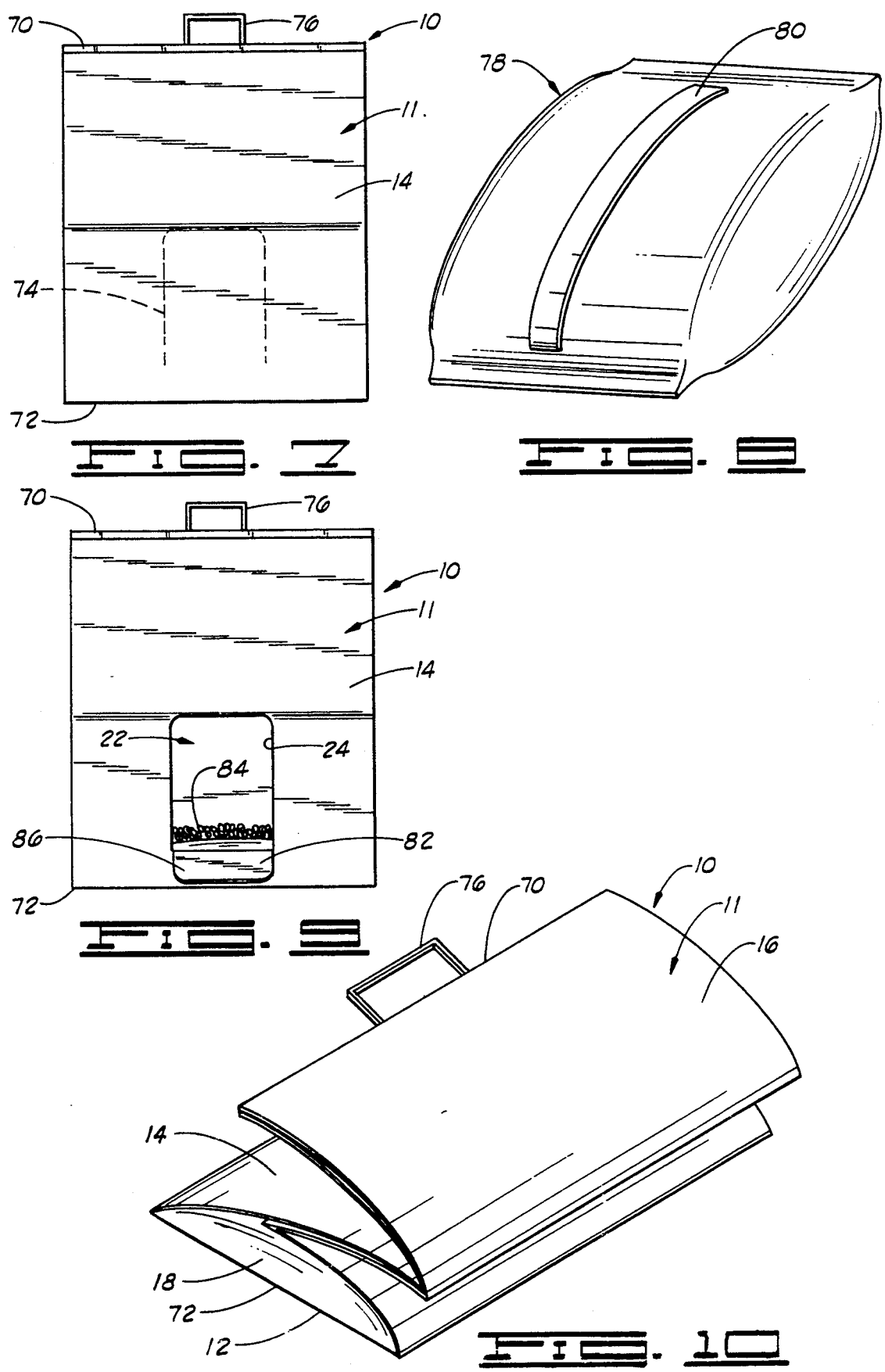

METHOD OF DISPOSING OF ANIMAL WASTES

FIELD OF THE INVENTION

The present invention relates generally to pet litter housings and, more particularly, but not by way of limitation, to a pet litter housing which is foldable to a substantially flat non-operating position and unfoldable to an operating position providing a pet receiving space.

BRIEF DESCRIPTION OF THE DRAWINGS

FIG. 1 is a front elevational view of a pet litter housing constructed in accordance with the present invention shown in the operating position.

FIG. 2 is a back elevational view of the pet litter housing of FIG. 1.

FIG. 3 is a side elevational view of the pet litter housing of FIGS. 1 and 2.

FIG. 4 is a side elevational view of the pet litter housing of FIGS. 1 and 2, similar to FIG. 3, but showing the opposite side of the pet litter housing.

FIG. 5 is a top elevational view of the pet litter housing of FIGS. 1 and 2.

FIG. 6 is a bottom elevational view of the pet litter housing of FIGS. 1 and 2.

FIG. 7 is front elevational view of the pet litter housing, similar to FIG. 1, but showing the pet litter housing prior to the forming of the pet opening.

FIG. 8 is a partial prospective view of a bag of pet litter which is disposable within the pet receiving space of the pet litter housing of FIGS. 1 and 2.

FIG. 9 is a view similar to FIG. 1 showing kitty litter disposed generally within the pet receiving space.

FIG. 10 is a partial perspective view of the pet litter housing of the present invention in about a folded position.

DESCRIPTION OF THE PREFERRED EMBODIMENTS

As shown in FIGS. 1 through 7 and designated therein by the general reference numeral 10 is a pet litter housing constructed in accordance with the present invention. In general, the pet litter housing 10 includes a container 11 having a bottom wall 12, a front wall 14, a rear wall 16, a first side wall 18 and a second side wall 20. The walls 12, 14, 16, 18 and 20 are interconnected so that the walls 14, 16, 18 and 20 substantially surround and enclose a pet receiving space 22 (FIG. 1). A pet opening 24 (FIG. 1) is formed through the front wall 14 and the pet opening 24 is sized so that a pet (dog or cat or the like) can go through the pet opening 24 and into the pet receiving space 22.

The bottom wall 12 has a first side 26, a second side 28, a first end 30 and a second end 32. The sides 26 and 28 and the ends 30 and 32 are interconnected so that the bottom wall 12 has a generally rectangular shape.

The rear wall 16 has a first side 34, a second side 36, a first end 38 and a second end 40. The sides 34 and 36 and the ends 38 and 40 are interconnected so that the rear wall 16 is generally rectangular shaped. The first end 38 of the rear wall 16 is connected to the first side 26 of the bottom wall 12 and the rear wall 16 extends a distance from the first side 26 of the bottom wall 12 terminating with the second end 40 of the rear wall 16.

The front wall 14 has a first side 42, a second side 44, a first end 46 and a second end 48. The sides 42 and 44 and the ends 46 and 48 are interconnected so that the front wall 14 is generally rectangular shaped. The first end 46 of the front wall 14 is connected to the second side 28 of the bottom wall 12 and the front wall 14 extends a distance from the second side 28 of the bottom wall terminating with the second end 48 of the front wall 14.

The first side wall 18 has a first side 50, a second side 52, a first end 54 and a second end 56. The sides 50 and 52 and the ends 54 and 56 are interconnected so that the first side wall 18 has a generally rectangular shape. The first end 54 of the first side 18 is connected to the second end 32 of the bottom wall 12 and the first side wall 18 extends a distance from the first end 30 of the bottom wall 12 terminating with the second end 56 of the first side wall 18. The first side 50 of the first side wall 18 is connected to the second side 36 of the rear wall 18 and the second side 52 of the first side wall 18 is connected to the second side 44 of the front wall 14.

The second side wall 20 has a first side 58, a second side 60, a first end 62 and a second end 64. The first end 62 is connected to the first end 30 of the bottom wall 12 and the second side wall 20 extends a distance from the second end 32 of the bottom wall 12 terminating with the second end 64 of the second side wall 20. The sides 58 and 60 and the ends 62 and 64 are interconnected to form a generally rectangularly shaped second side wall 20. The first side 58 of the second side wall 20 is connected to the first side 34 of the rear wall 16 and the second side 60 of the second side wall 20 is connected to the first side 42 of the front wall 14.

A first gusset 66 is formed in the first side wall 18. A second gusset 68 is formed in the second side wall 20. The gussets 66 and 68 comprise fold lines in the respective side walls 18 and 20. The fold lines in the side walls 18 and 20 are positioned so that each side wall 18 and 20 is foldable or collapsible inwardly generally near and spaced a distance from the bottom wall 12 and so the sides of the respective side walls 18 and 20 are foldable or collapsible inwardly generally toward each other thereby moving the rear wall 16 generally toward the front wall 14. When the side walls 18 and 20 are folded or collapsed in this manner a portion of the bottom wall 12 is folded or collapsed to a position generally adjacent the rear wall 16 and the front wall 14 is brought to a position generally adjacent the rear wall 16. The front and rear walls 14 and 16 then are folded to position the container 11 in a folded, non-operating position. The container 11 is shown in FIG. 10 in a partially folded, non-operating position as just described.

The second ends 40, 48, 56 and 64 of the respective walls 16, 14, 18 and 20 are connected to form a closed upper end 70 of the container 11. The bottom wall 12 forms a closed lower end 72 of the container 11.

In the opened, operating position of the container 11, the side walls 18 and 20 are folded outwardly moving the front and rear walls 14 and 16 apart and opening the pet receiving space 24. In the opened, operating position, a portion of the side walls 18 and 20 still are folded or collapsed inwardly generally near the respective ends 56 and 64 because the ends 40, 48, 56 and 64 are connected. As shown in FIGS. 3 and 4, the container 11 has a generally triangular shape in one cross section in the opened, operating position of the container 11.

As shown in FIG. 7, a generally rectangularly shaped line of perforations 74 is formed in the front wall 14 generally midway between the sides 42 and 44. The line of perforations 74 extends generally about the pet opening 24. In one embodiment, the line of perforations 74 extends over only three sides of the rectangularly shaped pet opening 24 so the line of perforations 74 does not extend across the bottom side of the rectangularly shaped pet opening 24.

A handle 76 is connected to the upper end 70 of the container 11. The handle 76 is grippable by an individual for carrying the container 11.

In one embodiment, the pet litter housing 10 also includes a litter bag 78, as shown in FIG. 8. The litter bag 78 encloses and contains a quantity of pet litter. A slit (not shown) is formed in the litter bag 78 and the slit extends generally between the opposite ends of the litter bag 78. A strip 80 is removably connected to the litter bag 78, such as by adhesively connecting, and the strip 80 extends over and closes the slit in the litter bag 78.

In operation, the container 11 is collapsed to the folded, non-operating position for storage. When it is desired to use the container 11, the container 11 is positioned in the unfolded, operating position. In one form, the individual first opens the line of perforations 74 to form the pet opening 24, and the individual then places the individual's hands through the pet opening 24 and pushes the side walls 14 and 16 outwardly to position the container 11 in the opened, operating position. As shown in 1, 5, 6, and 9, the line of perforations 74 are severed along three sides so a portion of the front wall 14 forms a door 82 which is connected to the bottom side of the pet opening 24. The line of perforations 74 could be arranged so the door 82 folds upwardly.

The container 11 may already contain the litter bag 78 or the individual may have to dispose the litter bag 78 through the pet opening 24 and into the pet receiving space 22. With the litter bag 78 in the pet receiving space 22 and disposed on the bottom wall 12, the individual removes the strip 80 and opens the litter bag 78 to expose the pet litter (the exposed pet litter being shown in FIG. 9 and designated by the reference numeral 84).

The pet opening 24 is sized and adapted so the pet can enter into and exit from the pet receiving space 22 via the pet opening 24.

When it is desired to dispose of the container 11, the container 11 is collapsed and positioned in the folded, non-operating position. The folded or collapsed container 11 with the used pet litter therein is simply thrown in the trash.

It should be noted that the pet litter housing 10 of the present invention is designed so an individual never has come into contact with the new or used pet litter. The pet litter housing 10 also provides an easy, economical and convenient way to accommodate one's pet while traveling.

The container 11 may be constructed of any material which can operate or function in the manner described herein. The material preferable is a paper, 70# Kraft paper, for example. The inner surface of the paper is treated or the paper is lined with a liner 86 (FIGS. 1 and 9) to render such paper substantially water proof. The liner 86 may be a 1.0 mils thick polyethylene material, for example which is bonded to the paper. Shown in FIGS. 1 and 9 is a portion of the liner 86 on the inside of door 82, and on a portion of the inside of the rear wall 16, although it will be understood that the liner 86 covers the entire inner surface of the bottom wall 12 and the walls 14, 16, 18 and 20.

The paper from which the container 11 is constructed has a thickness of about 7.3 mils and, preferably, the thickness is in a range from about 2.0 mils to about 30.0 mils.

The container 11 also can be constructed of a man-made organic plastic film, such as polypropylene. The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications.

The man-made organic plastic film has a thickness in a range from about 2.0 mils to about 30.0 mils.

Changes may be made in the construction and the operation of the various components, and elements described herein with respect to the pet litter housing 10 and changes may be made in the steps or the sequence of steps of the methods described herein with respect to the pet litter housing 10 without departing from the spirit and scope of the invention as defined in the following claims.

What is claimed is:

1. A method for accommodating a pet providing a disposable pet litter housing comprising:
   a bottom wall having a first side, a second side, a first end and a second end;
   a first side wall having a first side, a second side, a a first end and a second end, the first end of the first side wall being connected to the second end of the bottom wall;
   a second side wall having a first side, a second side, a a first end and a second end, the first end of the second side wall being connected to the first end of the bottom wall;
   a rear wall having a first side, a second side, a first end and a second end, the first end of the rear wall being connected to the first side of the bottom wall;
   a front wall having a first side, a second side, a first end and a second end, the first end being connected to the second side of the bottom wall, the first side of the first side wall being connected to the second side of the rear wall, the second side of the first side wall being connected to the second side of the front wall, the first side of the second side wall being connected to the first side of the rear wall and the second side of the second side wall being connected to first side of the front wall, the second ends of the first and second side walls and the second ends of the front and rear walls being connected to form a closed upper end, the bottom wall, the first and the second side walls and the rear and front walls cooperating to enclose a pet receiving space with the pet receiving space being sized to receive and accommodate the pet;
   a first gusset formed in the first side wall;
   a second gusset formed in the second side wall;
   the first and second gussets cooperating whereby the first and second side walls are foldable inwardly for moving the rear wall toward the front wall, the first and second side walls and the front and rear wall being foldable on and adjacent the bottom wall to position the pet litter housing in a folded nonoperating position, and the first and second side walls being foldable outwardly for moving the rear wall generally away from the front wall and the first and second side walls and the front and rear walls being unfoldable to a position wherein the front and rear walls and the first and second side walls each extend a distance generally upwardly from the bottom wall to an unfolded operating position wherein the first and second side walls and the front and rear walls and the bottom wall cooperate to form the pet receiving space, a pet opening being formed only through the front wall with the pet receiving opening being shaped and adapted to accommodate the pet so the pet can enter the pet receiving space via the pet opening;

unfolding the pet litter housing to the position wherein the front and the rear walls and the first and the second side walls each extend a distance generally upwardly from the bottom wall to the unfolded operating position;

disposing pet litter in the pet receiving space;

permitting the pet to enter into the pet receiving space via the pet receiving opening and permitting the pet to exit the pet receiving space via the pet receiving opening;

folding the pet litter housing to the folded nonoperating position; and disposing of the pet litter housing with a pet litter disposed therein.

* * * * *

UNITED STATES PATENT AND TRADEMARK OFFICE
CERTIFICATE OF CORRECTION

PATENT NO. : 5,396,864
DATED : March 14, 1995
INVENTOR(S) : Mannschreck

It is certified that error appears in the above-identified patent and that said Letters Patent is hereby corrected as shown below:

Column 1, line 26, after the word "is" please insert -- a --.

Column 1, line 29, please delete "prospective" and substitute therefor -- perspective --.

Column 2, line 10, please delete "first side 18" and substitute therefor -- first side wall 18 --.

Column 2, line 15, please delete "rear wall 18" and substitute therefor -- rear wall 16 --.

Column 2, line 57, please delete "receiving space 24" and substitute -- pet opening 24 --.

Column 3, line 23, please delete "side walls 14 and 16" and substitute therefor -- side walls 18 and 20 --.

Column 3, line 25, after "in" please insert -- FIGS. --

Column 3, line 55, please delete "preferable" and substitute therefor -- preferably --.

Column 4, line 34, please delete "a a" at end of line and substitute therefor -- a --.

UNITED STATES PATENT AND TRADEMARK OFFICE
CERTIFICATE OF CORRECTION

PATENT NO. : 5,396,864
DATED : March 14, 1995
INVENTOR(S) : Mannschreck

It is certified that error appears in the above-identified patent and that said Letters Patent is hereby corrected as shown below:

Column 4, line 39, please delete "a" at beginning of line.

Signed and Sealed this

Fourth Day of July, 1995

Attest:

BRUCE LEHMAN

Attesting Officer

Commissioner of Patents and Trademarks